(12) United States Patent
Farmer et al.

(10) Patent No.: US 12,165,105 B1
(45) Date of Patent: Dec. 10, 2024

(54) AUTOMATIC GENERATION OF CLAIM VALUES IN VEHICLE-RELATED INCIDENTS USING DATA FROM VARIOUS SOURCES

(71) Applicant: UIPCO, LLC, San Antonio, TX (US)

(72) Inventors: William Daniel Farmer, Carrollton, TX (US); Andre Rene Buentello, San Antonio, TX (US); Jose L. Romero, Jr., San Antonio, TX (US); Priyadarshini Badugu, Frisco, TX (US); Will Kerns Maney, San Antonio, TX (US); Elena Marie Carrasco, Converse, TX (US); David Patrick Dixon, Boerne, TX (US); Subhalakshmi Selvam, Allen, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 386 days.

(21) Appl. No.: 16/888,174

(22) Filed: May 29, 2020

(51) Int. Cl.
*G06Q 40/00* (2023.01)
*G06F 30/15* (2020.01)
(Continued)

(52) U.S. Cl.
CPC ............. *G06Q 10/10* (2013.01); *G06F 30/15* (2020.01); *G06Q 10/20* (2013.01); *G06Q 30/0205* (2013.01); *G06Q 30/0206* (2013.01); *G06Q 30/04* (2013.01); *G06Q 40/08* (2013.01); *G06V 20/54* (2022.01); *G07C 5/0808* (2013.01); *G06V 2201/08* (2022.01)

(58) Field of Classification Search
CPC ........ G06Q 40/08; G06Q 40/02; G06Q 10/10; G06Q 30/02; G06F 19/328
USPC ....... 705/4, 5, 39, 37, 38, 40; 709/201, 227; 706/25, 45; 235/375, 380
See application file for complete search history.

(56) References Cited

U.S. PATENT DOCUMENTS 8,265,963 B1 * 9/2012 Hanson .................. G06Q 10/10
705/5
8,401,896 B2 * 3/2013 Wargin ............ G06Q 10/06316
705/4

(Continued)

OTHER PUBLICATIONS

AAA: Accident Avoidance Agent; 2016 TRON Symposium (TRONSHOW) (pp. 1-9); Tolgahan Cakaloglu; Kenji Yoshigoe; Dec. 14, 2016. (Year: 2016).*

(Continued)

*Primary Examiner* — Tien C Nguyen
(74) *Attorney, Agent, or Firm* — Perkins Coie LLP

(57) ABSTRACT

The present embodiments relate to automatic claim value generation. Particularly, the present embodiments include retrieving information from various sources and processing the data to derive an overview of damage to vehicles incurred during a vehicle accident, deriving an estimated value (or "cost") to rectify the damage, and a client-specific claim value to be presented to the client representing a value to rectify the damage based on a policy corresponding to the client. The present embodiments provide an automated (or "touchless") claim value payout system to provide a claim value specific to the client and the accident incurred by the client that is performed by a computing device without intervention by an operator.

20 Claims, 7 Drawing Sheets

(51) Int. Cl.
  *G06Q 10/10* (2023.01)
  *G06Q 10/20* (2023.01)
  *G06Q 30/0201* (2023.01)
  *G06Q 30/0204* (2023.01)
  *G06Q 30/04* (2012.01)
  *G06Q 40/08* (2012.01)
  *G06V 20/54* (2022.01)
  *G07C 5/08* (2006.01)

(56) References Cited

U.S. PATENT DOCUMENTS

| | | | | |
|---|---|---|---|---|
| 8,433,588 | B2* | 4/2013 | Willis | G06Q 40/08 |
| | | | | 705/2 |
| 9,082,015 | B2* | 7/2015 | Christopulos | G06V 20/176 |
| 9,646,345 | B1* | 5/2017 | Leise | G01M 17/00 |
| 10,504,306 | B1* | 12/2019 | Konrardy | G08B 25/08 |
| 10,832,334 | B2* | 11/2020 | Plummer | G06T 7/00 |
| 10,949,814 | B1* | 3/2021 | Nelson | G06Q 10/20 |
| 11,062,437 | B2* | 7/2021 | Stefan | G06T 7/0002 |
| 11,430,231 | B2* | 8/2022 | Takamoto | G06V 20/597 |
| 2002/0007289 | A1* | 1/2002 | Malin | G06Q 10/06 |
| | | | | 705/305 |
| 2004/0073434 | A1* | 4/2004 | Volquardsen | G06Q 10/06 |
| | | | | 705/305 |
| 2010/0063852 | A1* | 3/2010 | Toll | G06Q 40/08 |
| | | | | 705/4 |

OTHER PUBLICATIONS

A System for Automatic Notification and Severity Estimation of Automotive Accidents; IEEE Transactions on Mobile Computing (vol. 13, Issue: 5, pp. 948-963); Manuel Fogue, Piedad Garrido, Juan-Carlos Cano, Carlos T. Calafate, Pietro Manzoni, Francisco J. Martinez; (Year: 2014).*

Estimation architecture for future autonomous vehicles; Proceedings of the 2002 American Control Conference (IEEE Cat. No. CH37301) (vol. 2, pp. 1108-1114 vol. 2); S. Brunke, M. Campbell, May 8, 2002 . . . (Year: 2002).*

AOID: adaptive on-line incident detection system; 2006 IEEE Intelligent Transportation Systems Conference (pp. 858-863); A.P. Boedihardjo; Chang-Tien Lu; Sep. 17, 2006. (Year: 2006).*

Image processing based severity and cost prediction of damages in the vehicle body: A computational intelligence approach; 2017 National Information Technology Conference (NITC) (pp. 18-21); W.A. Rukshala Harshani, Kaneeka Vidanage; Sep. 14, 2017 . . . (Year: 2017).*

* cited by examiner

AUTOMATIC GENERATION OF CLAIM VALUES IN VEHICLE-RELATED INCIDENTS USING DATA FROM VARIOUS SOURCES

TECHNICAL FIELD

This disclosure is directed generally to systems, methods, and apparatuses for automatic value derivation utilizing multiple sources of data.

BACKGROUND

Vehicle-related incidents (or simply "vehicle accidents") are a common occurrence. Vehicle accidents can involve one or more parties and one or more vehicles. For example, a first vehicle may drive into a rear portion of a second vehicle, thereby causing damage to both vehicles.

In many cases, an entity may assist a client in repairing the damage to the vehicle by generating a claim value representing a value to repair the vehicle based on a policy with the client. To identify a value to repair the damage to the vehicle, multiple steps may be performed. For instance, the vehicle or data (e.g., images) indicative of the damage to the vehicle(s) may be retrieved and inspected to derive an extent of the damage to the vehicle. A service provider (e.g., a vehicle repair specialist) can inspect the vehicle or data indicative of the damage to the vehicle to derive an estimated repair value to repair the damage to the vehicle. This value can be utilized in generation of a claim value to be presented to the client.

Figure 1:
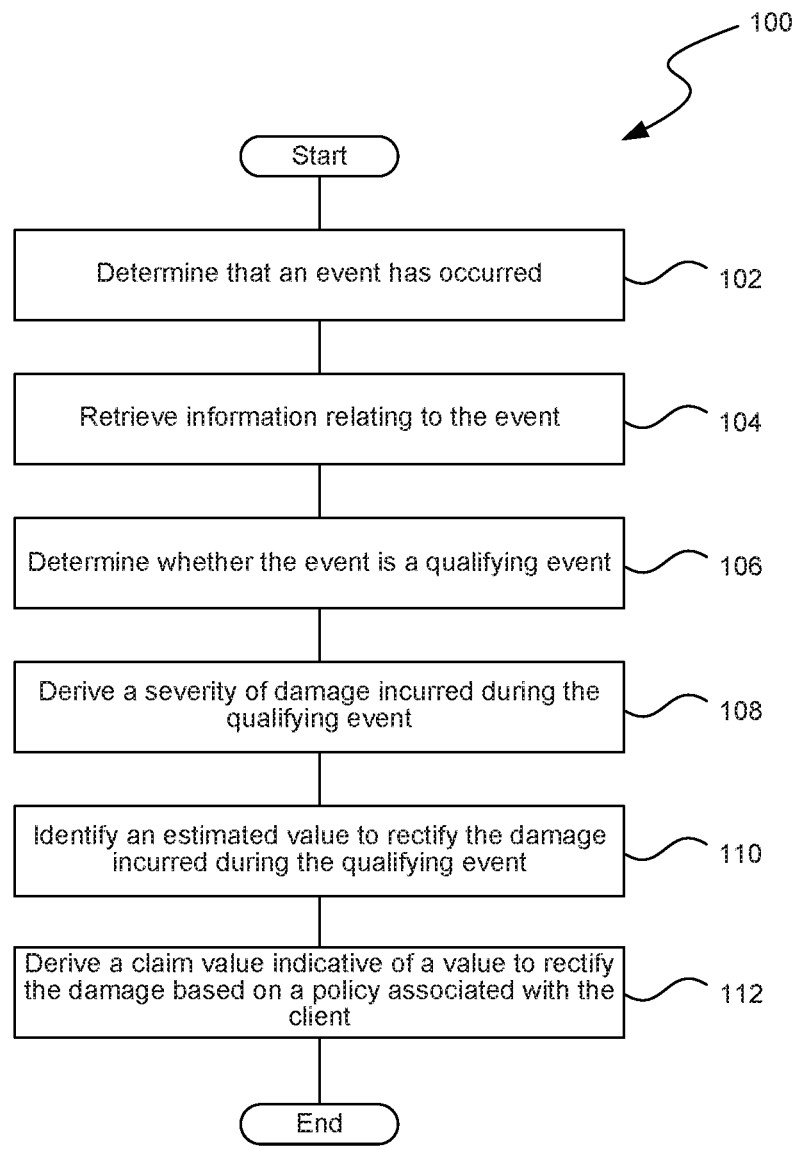
FIG. 1 is a flow diagram of an example method for automatically generating a claim value for a qualifying event.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Vehicle accidents are a relatively common occurrence on roadways. As an illustrative example, a first vehicle drives into a second vehicle, causing damage to both vehicles. In such a vehicle accident, parties may perform a series of steps to rectify/repair the damage caused in the vehicle accident. Further, for example, any number of the parties can have policies with various entities that include an ability for the entity to assist with the cost of repairing the vehicle.

A first step may include determining an extent of the damage incurred during the accident. This may include capturing information (e.g., images, notes) depicting the damage to vehicles in the accident and inspecting this information to determine an extent of the damage. For example, images of the vehicles can be captured and subsequently inspected to determine parts of the vehicles that are damaged and an extent of the damage to each part of the vehicles.

Once the parts of the vehicles that are damaged and an extent of the damage to each part of the vehicles are determined, a value to rectify the damage can be determined. In many cases, this can include comparing the obtained information against previously-calculated estimated values to derive a value to rectify the damage. In some instances, quotes may be received from various local providers of vehicle restoration services indicative of a quoted value to rectify the damage for that region.

The information relating to the extent of the damage to the vehicles and the received quotes to rectify the damage can be used to identify a value (e.g., a claim value) to present to the client. As an example, the value can represent a cost to a client to rectify the damage less than an applicable deductible agreed upon by the client in a policy.

Performing the steps of deriving an extent of damage to vehicle(s), determining a localized estimated value to rectify the damage, and estimating a value to present to the client to rectify the damage based on policy information may be capable of being implemented by one or more computing devices. However, such a process may be computational-resource intensive. For instance, this can include retrieving information from various external sources and requesting information from a series of sources. Accordingly, this may result in inefficient communication across computer networks.

Further, a computational process to derive a claim value can result in lower quality values and source information. For instance, if the damage is not properly stated, this may result in inefficient derived extent of damage to the vehicles. As another example, if the quoted estimated value to fix the vehicle is inaccurate for a geographic region or is based off an inaccurate damage extent value, the resultant value to rectify the vehicle may be incorrect. This may result in multiple attempts to accurately generate the values, which can result in inefficient use of computer network resources.

Further, in many cases, emergency services may be requested to assist with the above process. For instance, a passenger of a vehicle in an accident may need medical attention if the accident was above a threshold severity. In such an instance, the passenger may go to a medical facility to have a professional evaluate the passenger for any injuries, if any. This process may require the passenger to populate various forms to have insurance companies identified for the medical center. This process can be tedious and difficult for the passenger to perform given the required detail in the forms and the distress of the individual caused by the vehicle accident.

System Overview

The present embodiments relate to automatic claim value generation. Particularly, the present embodiments may include retrieving information from various sources and processing the data to derive an overview of damage to vehicles incurred during a vehicle accident, deriving an estimated value (or "cost") to rectify the damage, and a client-specific claim value to be presented to the client representing a value to rectify the damage based on a policy corresponding to the client. The present embodiments may provide an automated (or "touchless") claim value payout system to provide a claim value specific to the client and the accident incurred by the client that is performed by a computing device without intervention by an operator.

The present embodiments may provide an accurate and automatic computer-implemented generation of a claim value for the client that increases user experience upon incurring a vehicle accident. The system can also decrease costs associated with paying out auto claims. The system can identify a qualifying claim (e.g., a vehicle accident below a certain severity or amount of damage, a "no fault" accident, an accident in which no medical issues were incurred) based on various sources of information retrieved that provides information relating to a vehicle accident. Based on a qualifying claim being identified, the system can generate a claim value that can be provided to the client that allows the client to settle the claim with the claim value minus any other factors (e.g., a deductible associated with a policy for the client). The claim value can be offered to the client for a set period of time (e.g., a day, three days, a week), and can be rescinded after the set period of time. In some instances, if the client contacts the claim provider (e.g., an entity operating/maintaining a computing device), the claim value can be reduced by a specified amount. This can be attributed to the added cost in having an agent for the entity communicate with the client.

The system may use various sources of information to derive whether the vehicle accident (or simply "event") includes a qualifying event that is an event that can automatically derive a claim value and/or to derive a severity of damage to vehicle(s) involved in the qualifying event, for example. The various sources of information can include, for example, vehicle sensor data, images captured by a mobile device of the client or a third party mobile device, smart city information (e.g., images from cameras disposed around a city), municipality information (e.g., a police report), etc. In some cases, toll system pictures and/or traffic camera images can be used to verify a location of the client and the state of the vehicle for fraud prevention as well as to detect opportunities for preventative maintenance. To increase data relating to claims, the client can provide pictures of their vehicle or home or listen to a disclosure and be provided an incentive or a discount to the claim value for providing such information.

A computing node can obtain information from the various sources and process the information to determine what information is relevant to the event and to determine characteristics of the event to make various determinations as described herein. The computing node can transmit relevant information relating to a severity of damage to vehicles to specified service providers (e.g., automobile mechanics) based on a determined region of the client and/or the location of the event. The service providers can provide an estimated value to rectify the damage or a verification/update to computer-generated estimated values. In some embodiments, the estimated value can be automated based on previously-obtained estimated values to rectify similar damage to vehicles. The estimated repair values can be used to generate the claim value.

In some embodiments, individuals may need assistance after an event occurs. For instance, a driver of a vehicle may need to seek medical attention to attend to injuries in an automobile accident. In these embodiments, telematics from the vehicle can be used to determine the state of the vehicle. If it is not drivable, the system can call a tow truck and rent a car. In a connected city, the system can automatically obtain data from cameras (e.g., before and after accident), create a claim and make determinations on claims (e.g., assigning blame). The system can either create a draft police report or obtain a police report. The system can review other sources of data (e.g., wearables, vehicle data, smart city data) to assist in gathering relevant information.

FIG. 1 is a flow diagram of an example method 100 for automatically generating a claim value for a qualifying event. The method can include determining that an event has occurred (block 102). An event can include a vehicle accident or an incident that causes damage to a vehicle or an injury to an individual.

An event can be detected upon an indication from a client on a client device that an event has occurred. For instance, a client can provide an indication on an application executing on a smartphone indicating that a vehicle accident has occurred. In some embodiments, the system may determine that an event has occurred based on vehicle sensor data and/or client device data indicating that a vehicle accident has occurred. For example, if a sensor detection that airbags deployed on the vehicle, this information can be used to determine that a vehicle accident has likely occurred. In some cases, upon such a determination, an indication to appropriate service providers (e.g., a tow truck, emergency personnel) can be placed on behalf of the client. The indication can include location information relating to the location of the vehicle, client information, vehicle sensor data, etc.

The method may include retrieving information relating to the event (block 104). This information can be retrieved from various sources. Sources of event data can include vehicle sensor data, such as, for example, vehicle diagnostic information, images captured by vehicle cameras, information indicating whether a portion of a vehicle is damaged, etc.

Another example source of information can include data from a client device (e.g., a smartphone, a wearable device). This information can include sensor data from the client device. For instance, the source of information can include images captured by a camera disposed on the client device. As an example, the client device can capture images of a damaged bumper of a vehicle to identify the damaged area of the vehicle and the severity of the damage. The client device can send the data directly to the computing node or to the computing node via an application executing on the client device.

Another example of a source of information can include data from external sources. For instance, sensors disposed in an environment (or simply "smart city sensors") can provide images and other information relating to the event. The data from external sources can also include information from third-party computing nodes, such as from municipality devices or emergency personnel devices, for example.

The method can include determining whether the event is a qualifying event (block 106). A qualifying event can include an event (e.g., a vehicle accident) in which the computing node can automatically derive the claim value as described herein. The event can be a qualifying event based on any of a series of criteria being met.

For example, a criteria can include no medical attention, a level of severity of the damage to the vehicles, a number of vehicles/parties included in the event, whether a policy of the client allows automatic generation of a claim value, whether all parties in the event have policies with one or more policy providers, whether the damage to the vehicle can be readily identified and a damage estimate can be derived, etc. The event can be a qualifying event responsive to any number of criteria being met. For example, if three criteria are met, the event can be a qualifying event. Determining whether an event is a qualifying event is discussed in greater detail below.

In some embodiments, the source information can be processed to determine a cause of the event and/or to assign responsibility to a party involved in the event. For example, images/video depicting the event can be identified and processed to determine that a first vehicle drove into a second vehicle, thereby causing damage to both vehicles. Furthering this example, vehicle sensor data can be processed to derive whether the first vehicle decelerated at a rapid speed (e.g., whether the first vehicle applied the brakes rapidly) or if the second vehicle accelerated into the first vehicle. This can allow for responsibility to be assigned to a party involved in the event. The claim value can be modified based on whether the client has responsibility for the event or not.

The method can include deriving a severity of damage incurred during the qualifying event (block 108). As noted above, the event may result in damage to portions of at least one vehicle. Determining a severity of the damage can include processing any of vehicle sensor data and/or images of the damage captured by imaging devices.

This can include identifying all damaged parts of the vehicle. A computing node can perform image processing to derive parts of the vehicle that are damaged based on comparing the vehicle images to previously-identified listing of parts of a similar vehicle type. Of the identified parts that are damaged, a severity of the damage can be assessed. For instance, a level of deformity of the parts can be determined. As another example, whether the part is detached from the vehicle can be indicative of an extent of damage to the vehicle.

In some cases, a severity of damage can be assigned a score or rank indicative of the severity of the damage. For instance, minor damage can be assigned a lower score (e.g., a "1" out of "10"), while greater damage can be assigned a greater score (e.g., a "10" out of "10").

The method can include identifying an estimated value to rectify the damage incurred during the qualifying event (block 110). This estimated value can include a cost for a service provider to fix any damage incurred during the qualifying event. For example, this can include a cost for an automotive mechanic to fix all damage to the specified parts of the vehicle.

In some embodiments, a report providing images of the damage and other relevant information can be provided to service providers within a threshold proximity to the location of the event can be sent. Responses from the service providers can be obtained that includes estimated values to repair the damage.

In some cases, the system can automatically derive an estimated value to repair the vehicle. The vehicle damage and severity of the damage can be compared against previously-identified damage to a similar vehicle to generate an estimated value to repair the vehicle. In some instances, the estimated value generated by the system can be provided to service providers for the service providers to review and either validate or reject the estimated value.

The method can include deriving a claim value that is indicative of a value to rectify the damage based on a policy associated with the client (block 112). A claim value can include a value (e.g., or "cost") that can be presented to the client. The claim value can be modified based on features of a policy between the client and another entity. For example, a policy feature can include a deductible value that can be applied against the claim value, thereby modifying the value. In some cases, other factors can modify the claim value, such as an automatic reduction in the claim value if the client contacts the entity.

In some instances, the claim value can be provided in a report to the client. The report can include a detailed reasoning for deriving the claim value, such as including images of the vehicle, an estimated severity of the damage to the vehicle, an estimated repair value to repair the vehicle, etc. The claim value and/or report can be provided to the client via a variety of techniques, such as via an application executing on the client device, via mail, e-mail, etc.

In some cases, the claim value presented to the client can be active for a predetermined amount of time. For instance, the client may have two days or a week to approve the claim value. If the claim value is approved, the claim may be processed for the client. If the claim value is not approved, the claim value can be reduced or rescinded from consideration.

In some embodiments, the present embodiments can relate to a system for generation of a client value based on damage incurred in a vehicle-related event (e.g., a vehicle accident). The system can include a server configured to determine that a vehicle-related incident has occurred that causes damage to at least one portion of a vehicle.

In some embodiments, the server can obtain vehicle diagnostic information indicative of data acquired by a series of sensors disposed on the vehicle via a communication interface of the vehicle and process the vehicle diagnostic information to determine that the data acquired by the series of sensors indicating that damage has been caused to the vehicle or that a safety mechanism of the vehicle has been activated.

The server can retrieve a set of information relating to the vehicle-related incident from multiple sources. In some embodiments, the server can receive a set of vehicle sensor data from a communication interface of the vehicle, a set of client device data from the client device, the set of client device data including a first set of images indicative of the vehicle, and a set of external device data from at least one external device disposed in an environment surrounding the vehicle, the set of external device data including a second set of images indicative of the vehicle. The set of external device data can include a smart city device (e.g., a traffic camera) that is accessible to the server. The server can process the set of vehicle sensor data, the set of client device sensor data, and the set of external device data to identify a subset of data that represents information relating to each damaged portion of the vehicle.

The server can determine that the vehicle-related incident is an event that is capable of automatic generation of a client value based on the set of information relating to the vehicle-related incident. This can include determining that an event is a qualifying event, as described herein.

In some embodiments, the server can obtain a series of criteria that are indicative of whether the vehicle-related incident that is the event capable of automatic generation of the client value based on the set of information relating to the vehicle-related incident. The server can compare the set of information relating to the vehicle-related incident with the series of criteria to determine a number of criteria that are satisfied by the set of information relating to the vehicle-related incident and determine whether the number of criteria that are satisfied by the set of information relating to the vehicle-related incident exceed a threshold number. Responsive to determining that the number of criteria that are satisfied by the set of information relating to the vehicle-related incident exceeds the threshold number, the server can identify the vehicle-related incident as the event.

The server can process the set of information relating to the vehicle-related incident to identify each damaged portion of the vehicle that is damaged from the event. In some embodiments, the server can retrieve a set of images representing an undamaged vehicle that includes a vehicle type that corresponds to the vehicle type of the vehicle and compare the set of information relating to the vehicle-related incident with the set of images of the undamaged vehicle to identify each damaged portion of the vehicle by identifying whether each portion of the vehicle depicted in the set of information relating to the vehicle-related incident includes a difference from the set of images of the undamaged vehicle that exceeds a threshold difference.

In some embodiments, the server can process the set of information relating to the vehicle-related incident to generate a model representative of the vehicle compare the model representative of the vehicle with the set of images of the undamaged vehicle to identify each damaged portion of the vehicle.

The server can determine a severity of damage to each damaged portion of the vehicle. In some embodiments, for each portion of the vehicle, the server can identify the difference between the set of information relating to the vehicle-related incident and the set of images representing the undamaged vehicle and assign a severity value for each damaged portion of the vehicle, the severity value indicative of a level of the damage to each damaged portion of the vehicle.

The server can derive an estimated value to rectify the damage to each damaged portion of the vehicle based on the set of information relating to the vehicle-related incident and the determined severity of damage to each damaged portion of the vehicle. The estimated value may be to a region that includes a location of the event.

In some embodiments, the server can identify the location of the event based on the set of information relating to the vehicle-related incident. The server also can retrieve a listing of previously-identified rectification values that includes a series of entries identifying previously-identified values to rectify damage to portions of various vehicles. The server can also inspect the listing of previously-identified rectification values to identify a subset of entries in the listing of previously-identified rectification values that correspond to each damaged portion of the vehicle and the location of the event and combine each previously-identified rectification value that corresponds to each damaged portion of the vehicle to generate the estimated value to rectify the damage to each damaged portion of the vehicle.

In some embodiments, the server can generate an estimated damage value report that includes a listing of each portion of the vehicle that is damaged and a subset of the set of information of the vehicle-related incident relating to each portion of the vehicle. The server can also identify a service provider that is located within a threshold proximity of the vehicle. The server can send a request to a device associated with the service provider that includes the estimated damage value report. The server can receive a response from the device associated with the service provider that includes an estimated rectification values for each damaged portion of the vehicle. The server can combine each estimated rectification value for each portion of the vehicle that is damaged to generate the estimated value to rectify the damage to each damaged portion of the vehicle.

In some embodiments, the server can generate an estimated damage value report that includes, for each portion of the vehicle that is damaged, a subset of the set of information of the vehicle-related incident relating to each portion of the vehicle and the estimated value to rectify the damage to each portion of the vehicle. The server can also identify a service provider that is located within a threshold proximity of the vehicle. The server can also send a request to a device associated with the service provider that includes the estimated damage value report. The server can also receive a response from the device associated with the service provider that includes either a confirmation of the estimated value to rectify the damage to each portion of the vehicle or at least one update to the estimated value to rectify the damage to each portion of the vehicle. The server can also update the estimated value based on the response from the device associated with the service provider. The server can generate a client value that includes the estimated value that is modified by any of a set of features that are specific to a client.

The server can present the client value to a client device associated with the client. In some embodiments, the server can generate a report to be presented to the client, the report including a line-item listing of each portion of the vehicle that is damaged, a subset of the set of information representing each portion of the vehicle that is damaged, the previously-identified estimated rectification value for each portion of the vehicle that is damaged, wherein the report is presented to the client with the client value, the report accessible on an application executing on the client device.

In some embodiments, the server can determine that a predetermined time duration has elapsed without receipt of an acceptance notification from the client device indicating an acceptance of the client value, the predetermined time duration that beginning when the client value is presented to the client device. Responsive to determining that the predetermined time duration has elapsed, the server can lower the client value by a predetermined amount or remove the client value from the client device.

In some embodiments, the server can retrieve the set of features that are specific to the client from a repository of client data and modify the estimated value by values included in the set of features to derive the client value.

Example Environment Overview

Figure 2:
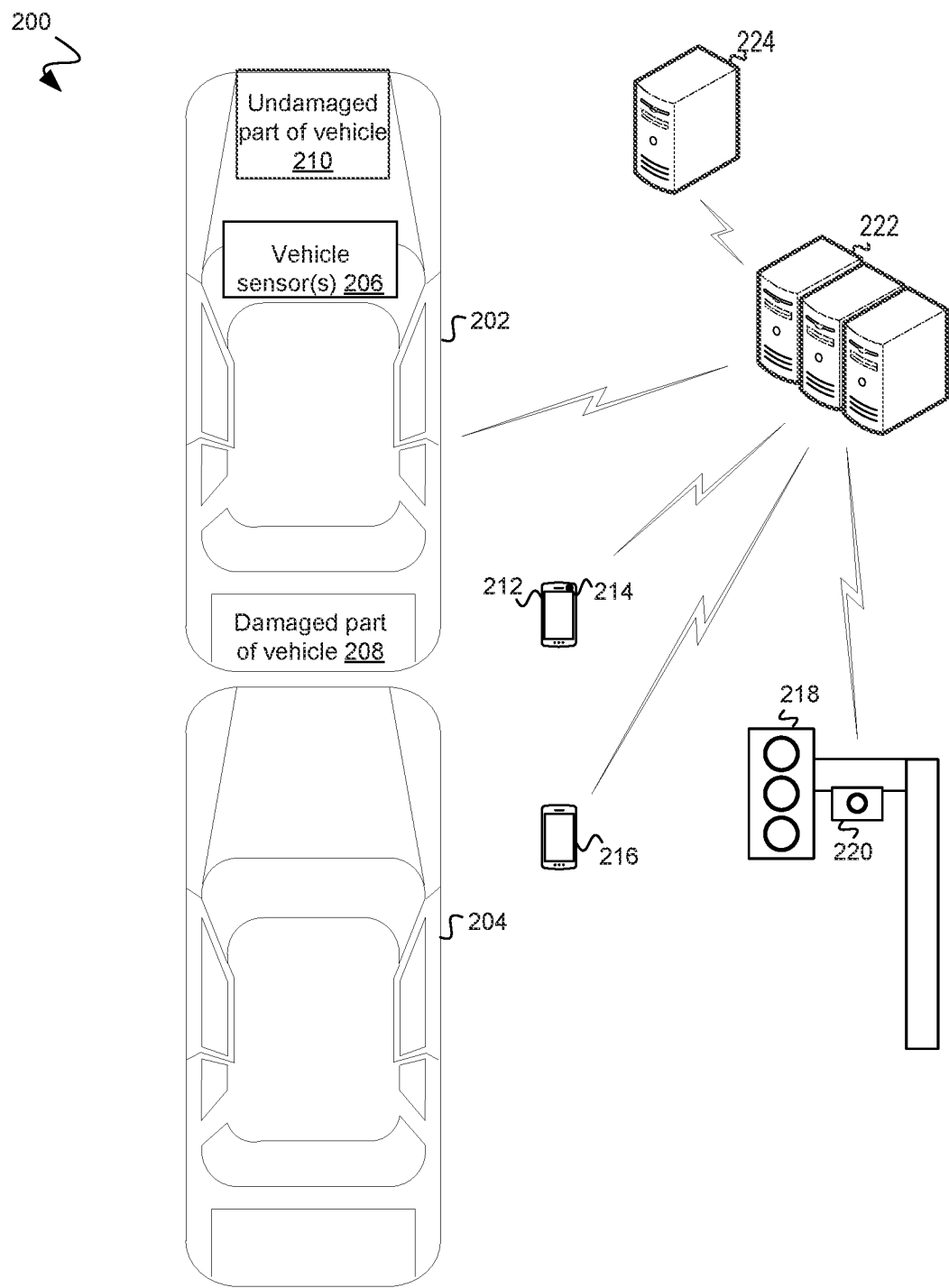
FIG. 2 is a block diagram of an example environment in which the present embodiments can be implemented.

FIG. 2 is a block diagram of an example environment 200 in which the present embodiments can be implemented. The environment 200 can include one or more vehicles (e.g., vehicle 202, vehicle 204). An event can involve one or more vehicles 202, 204 and/or other parties. While the embodiment as described in FIG. 2 depicts multiple vehicles in the event, any number of individuals/vehicles can be involved in the event.

In some embodiments, a vehicle (e.g., vehicle 202) can be associated with a client (e.g., a client of an entity), while another vehicle (e.g., vehicle 204) can be associated with another individual (e.g., an individual that is not a client of the entity). As shown in FIG. 2, a vehicle 202 can include a portion of the vehicle that is damaged 208 and a portion of the vehicle that is not damaged 210. The damaged portion of the vehicle 208 can be deformed or otherwise damaged due to the event (e.g., a vehicle accident with vehicle 204).

A vehicle 202, 204 can include vehicle sensors 206. Vehicle sensors 206 can include any sensor capable of acquiring vehicle data, such as cameras disposed on the vehicle, airbag sensors, vehicle diagnostic sensors, etc.

The environment 200 can include an electronic device 212, 216. An electronic device 212, 216 can include a mobile device, such as a mobile phone, tablet, wearable, etc., or another computing device. An electronic device 212, 216 can include a client device associated with a client of an entity. For instance, mobile device 212 can include a client device while device 216 can include a third party device associated with another individual that is not a client of the entity. An electronic device (e.g., device 212) can execute an application capable of communicating with network-accessible server system 222. The electronic devices can include sensors (e.g., camera 214) that can be utilized to provide data for performing tasks as described herein.

The environment 200 can include external devices, such as traffic camera 220. The external devices (e.g., traffic camera 220) can include smart city devices or other devices associated with an environment, such as a roadway, for example. As an example, traffic camera 220 can be primarily used to monitor traffic associated with traffic light 218, but the traffic camera 220 can also be used to provide information relevant to the event, such as images of the vehicles 202, 204.

The environment 200 can include a computing node 222. Computing node 222 can include one or more computing devices (e.g., computer, server) capable of performing processing tasks and maintaining information as described herein. In some instances, computing node 222 includes a network-accessible server system comprising a series of interconnected servers capable of transmitting data between servers. Computing node 222 can communicate with other devices included in the environment via various wired/wireless interfaces. The computing node 222 is described in greater detail with respect to FIG. 3.

The environment 200 can include a third-party server 224. The third-party server 224 can include a computing device associated with another entity (e.g., a municipality, medical entity). The computing node 222 can communicate with third-party server 224 to send/receive data with the third-party server 224. For example, third-party server 224 can provide smart city sensor data to the computing node 222. As another example, computing node 222 can provide populated forms to the third-party server 224 comprising a server associated with a medical entity.

Computing Node Overview

Figure 3:
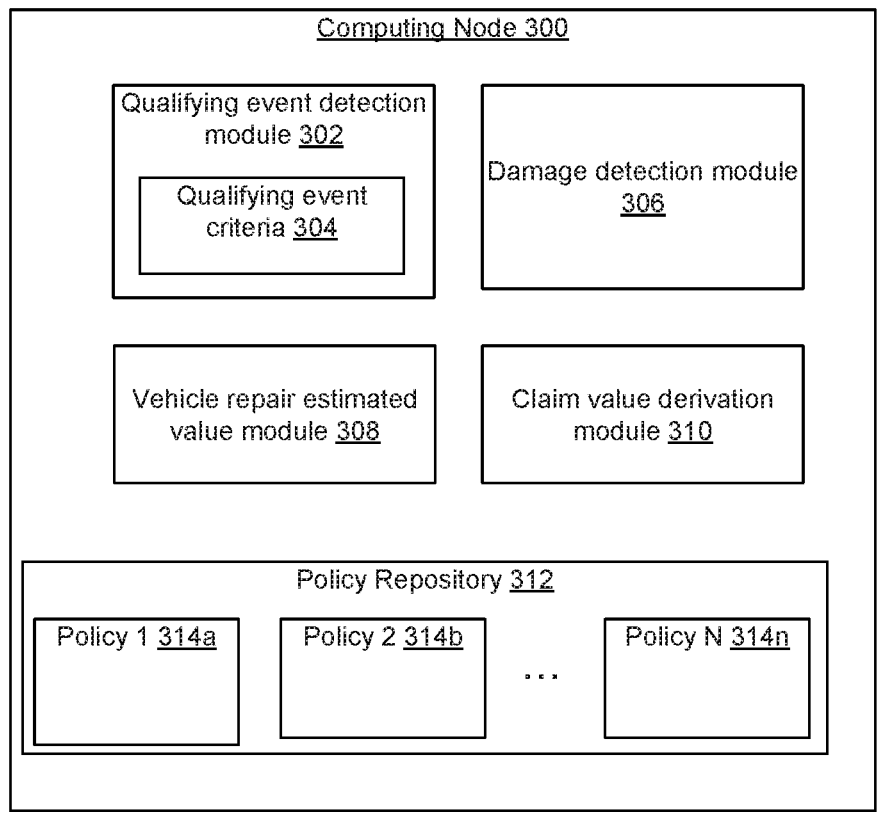
FIG. 3 is a block diagram of an example computing node.

FIG. 3 is a block diagram of an example computing node 300. As noted above, the computing node 300 can perform processing tasks as described herein. The computing node 300 can include computing node 222 as described with reference to FIG. 2.

The computing node 300 can include a qualifying event detection module 302. The qualifying event detection module 302 can process various types of source data to determine whether an event is a qualifying event. For instance, the qualifying event detection module 302 can compare source data with qualifying event criteria 304 (e.g., criteria indicative of whether the computing node 300 is capable of accurately deriving a claim value) to determine whether the event is a qualifying event. Determining whether an event is a qualifying event is discussed in greater detail with respect to FIG. 4.

The computing node 300 can include a damage detection module 306. The damage detection module 306 can process source data to determine parts of a vehicle that are damaged and to derive a severity of the damage to the damaged parts of the vehicle. For instance, the damage detection module 306 can compare images of the vehicle with previously-derived severity estimates of a similar vehicle to derive a severity of a part of the vehicle. Deriving damage and a severity of the damage to the vehicle is discussed in greater detail with respect to FIG. 4.

The computing node 300 can include a vehicle repair estimated value module 308. The vehicle repair estimated value module 308 can process damaged portions of the vehicle and severity values of a vehicle along with images of the damaged portions of the vehicle to derive an estimated value indicative of a value to repair the vehicle. In some instances, a report depicting information relating to the damage to the vehicle can be sent to selected service providers to provide estimated values to repair the vehicle. In other instances, the vehicle repair estimated value module 308 can automatically determine an estimated value to repair the vehicle based on previously-provided estimates for similar damage types to similar vehicles. Generating an estimated value is discussed in greater detail with respect to FIG. 5.

The computing node 300 can include a claim value derivation module 310. The claim value derivation module 310 can process the estimated value and a policy (e.g., policy 314a) to derive a client-specific claim value to present to the client. The claim value can represent a value provided to the client to repair the damage to the vehicle based on the policy of the client. The claim value derivation module 310 can utilize policy information in a policy repository 312 including multiple policies (e.g., policies 314a-n). Each policy 314a-n can be associated with a client and include client-specific features (e.g., a deductible value). Features in a policy 314a-n can be utilized to derive a claim value that is specific to the client.

Qualified Event Determination Overview

Figure 4:
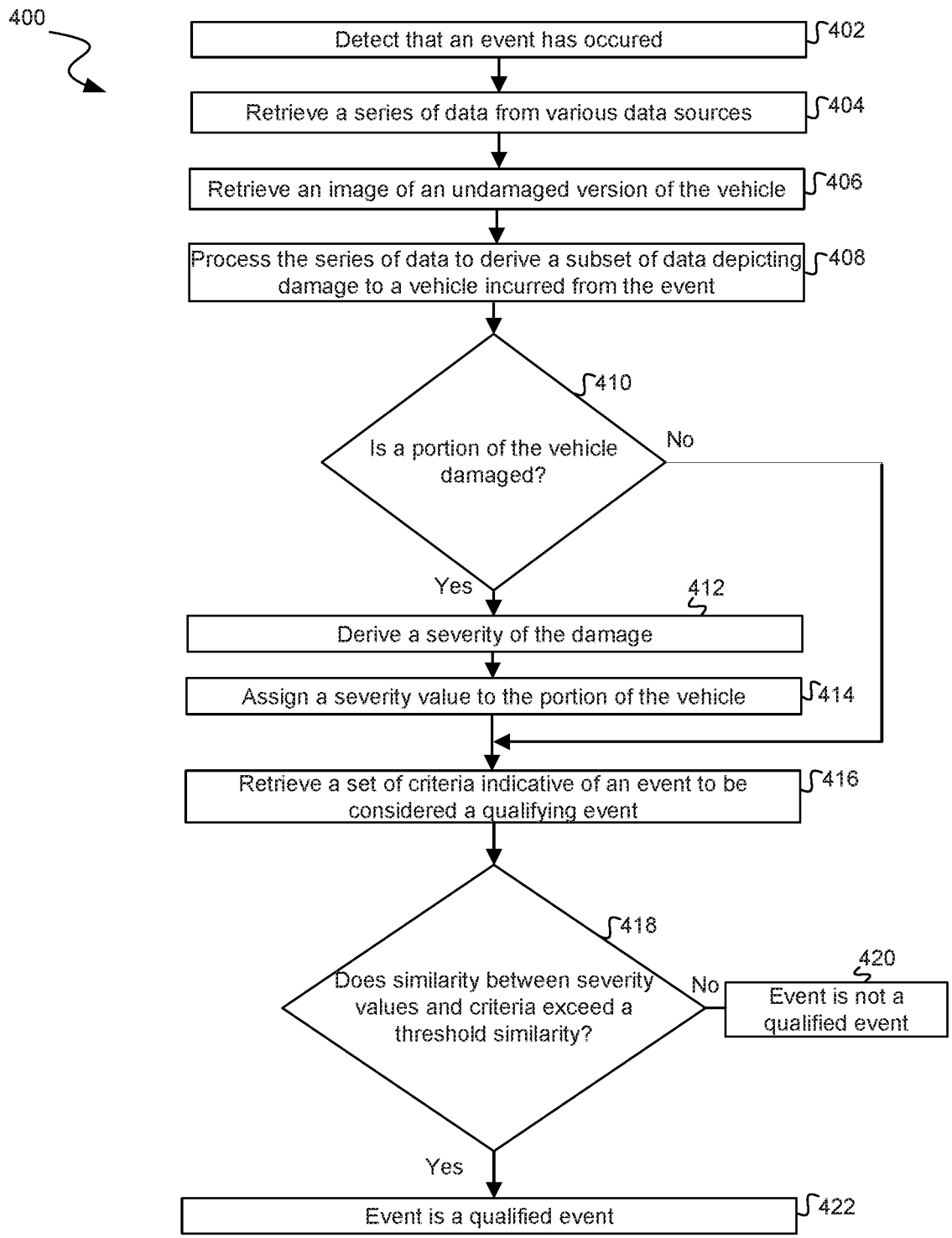
FIG. 4 is an example flow process illustrating a process for determining whether an event is a qualifying event.

FIG. 4 is an example flow process 400 illustrating a process for determining whether an event is a qualifying event. As noted above, data relating to an event (e.g., a vehicle accident) can be processed to determine whether the event comprises a qualifying event. A qualifying event can include an event that the present system is capable of automatically deriving an accurate claim value.

The process can include detecting that an event has occurred (block 402). This can be detected based on any of sensor data (e.g., airbag sensor activation), an indication by a client (e.g., via an application on client device), an external indication (e.g., an indication by a smart city device), etc.

The process can include retrieving a series of data from various data sources (block 404). The computing node can obtain data (e.g., sensor data, images, reports) from various sources (e.g., vehicle sensors, client device sensors, external computer nodes, third party devices) and process the data to derive detailed information relating to damage incurred during the event. In some instances, the data can be processed to identify a subset of the data that is relevant to the event. For instance, image processing can be performed on a series of images to only identify images that depict damage to the vehicle. As another example, sensor data can be processed to identify sensor data indicative of parts of the vehicle that are damaged.

The process can include retrieving images of an undamaged version of the vehicle (block 406). Images of an undamaged version of the vehicle in the event can be compared with images taken relating to the event to determine what portions of the vehicle are damaged. In some instances, this can include identifying a model of the vehicle involved in the event and retrieving relevant images of the vehicle.

The process can include processing the series of data to derive a subset of data depicting damage to the vehicle incurred from the event (block 408). This can include implemented image processing techniques to identify portions of a vehicle that differ from an undamaged version of the vehicle. In some instances, this can include generating a model indicative of images of the vehicle and processing the model to derive portions of the vehicle that are damaged.

The process can include determining whether a portion of the vehicle is damaged (decision block 410). This step can be repeated for each portion of a vehicle. If a portion of the vehicle is not damaged, the process may skip blocks 412 and 414.

If a portion of a vehicle is damaged, the process can include deriving a severity of the damage (block 412). Deriving a severity of a vehicle can include inspecting images of the vehicle and other data to derive a deviance of a part of a vehicle from an undamaged version of the part of the vehicle. For instance, a minor dent to a bumper of a vehicle may include a lower severity than that of a major dent or complete removal of the bumper from the vehicle.

The process can include assigning a severity value to the portion of the vehicle (block 414). A severity value can include a value indicative of a severity of the damage to the portion of the vehicle. For instance, damage of a portion of the vehicle with a deviance from an undamaged version of the vehicle can include a greater severity value. The severity value can be derived based on comparing images and/or other related data of the damaged portions of the vehicle with an undamaged version of a similar vehicle.

The process can include retrieving a set of criteria indicating an event to be considered a qualifying event (block 416). The set of criteria can include criteria that correspond to events that are qualifying event. For instance, the set of criteria can include conditions that, if they correspond to the event, are indicative that the event is a qualifying event. For example, a first criteria can include that all parties involved have policies with various entities, the damage is below a threshold level, there is no medical attention needed, blame in the event can be assigned, a threshold amount of information relating to the event is available, etc.

The process can include determining whether a similarity between the event and the set of criteria exceed a threshold similarity (decision block 418). This can include determining whether a threshold number of criteria are met by inspecting the information relating to the event. For instance, each criteria can include a condition that, if met, indicates that the event meets that criteria. As an example, if a condition of a criteria is that an average severity value to all damaged portions of the vehicle is below a predetermined value (e.g., a value of "5" out of 10), the condition is deemed to be met. As another example, if a condition of a criteria is that the estimated value to repair the vehicle is below a predetermined value (e.g., $1000, $3000), the condition is deemed to be met.

If the similarity between the event and the criteria does not exceed a threshold similarity, the event may not be a qualified event (block 420). If the similarity between the event and the criteria exceeds the threshold similarity, the event can be identified as a qualifying event (block 422).

Estimated Repair Value Generation Overview

Figure 5:
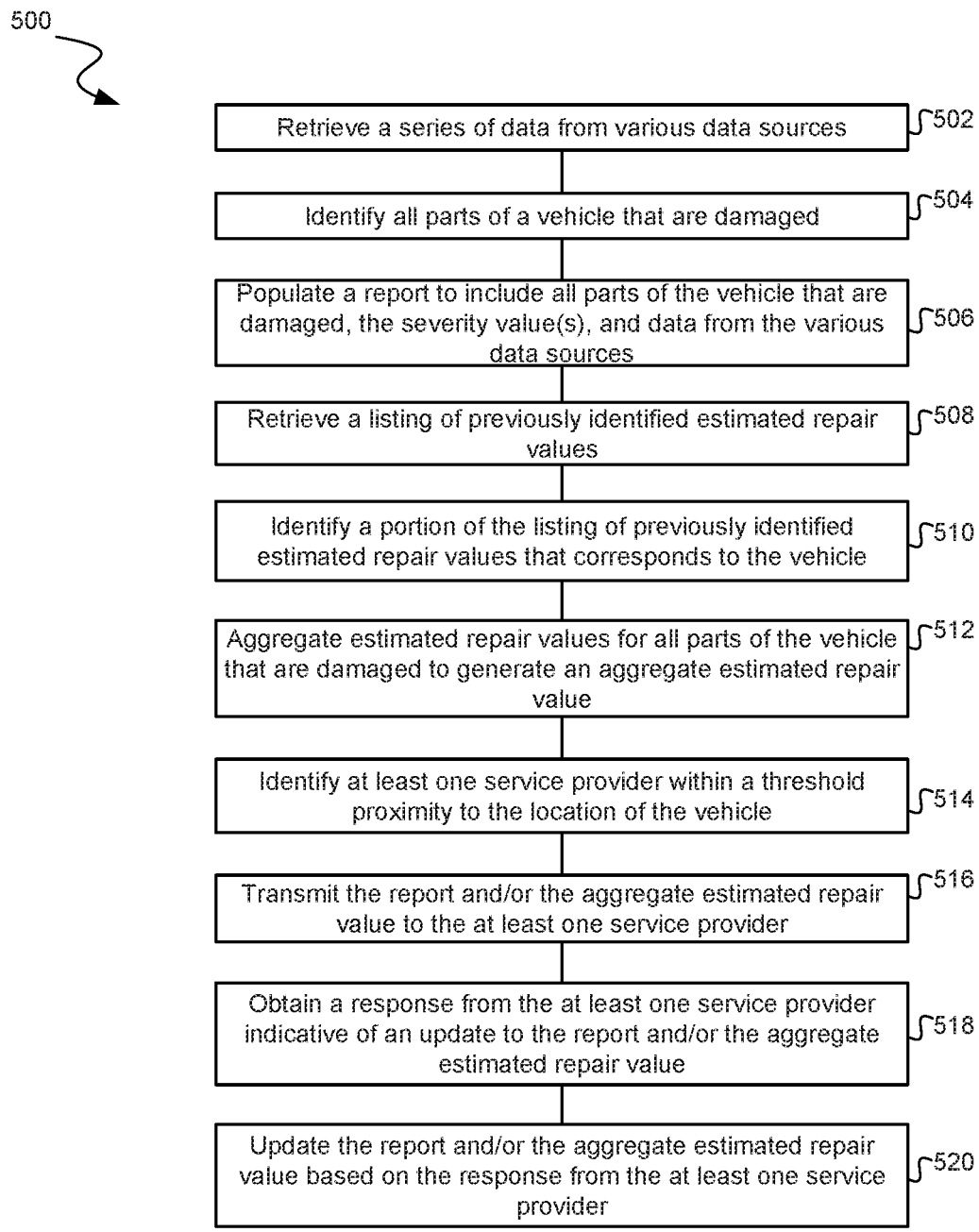
FIG. 5 is a block diagram illustrating an example process for generating an estimated value to repair damage to a vehicle.

FIG. 5 is a block diagram illustrating an example process 500 for generating an estimated value to repair damage to a vehicle. As shown in FIG. 5, the process can include retrieving a series of data from data sources (block 502). As noted above, the series of data can include images, sensor data reports, etc., retrieved from various sources (e.g., vehicle sensor interface, client device, external devices, smart city devices). In some embodiments, the data can be processed to identify a subset of the data that is relevant to determining damaged portions of the vehicle (e.g., by performing image processing to identify vehicle sensor data and images depicting damage to parts of the vehicle).

The process can include identifying all parts of vehicle that are damaged (block 504). In some instances, this can include processing vehicle diagnostic data to derive portions of the vehicle that are damaged. For example, the vehicle diagnostic system can include sensors detecting damage to portions (e.g., a bumper, side panel, axle) of a vehicle due to the event (e.g., vehicle accident). As another example, images can be processed to determine portions of the vehicle that are damaged. In some instances, a model of the vehicle can be generated based on combining a series of images/videos of the vehicle and/or any sensor data. In such an instance, the model can be processed to derive the portions of the vehicle that are damaged. This can include comparing the images and/or model with images depicting an undamaged version of the vehicle.

The process can include populating a report that includes all parts of the vehicle that are damaged, severity value(s), and data from various data sources (block 506). The report can include a table, repository, listing, database, etc., that illustrates each portion of the vehicle that is damaged. Each entry in the report can be associated with images and/or sensor data relating to the damage to the portion of the vehicle. Each entry can also include corresponding severity values of the damage previously derived. The report can include an easily accessible and reviewable listing of all portions of the vehicle that are damaged. For instance, the report can be processed to generate an estimated repair value to repair the vehicle or the report can be provided to a service provider to provide an estimated repair value.

The process can include retrieving a listing of previously identified estimated repair values (block 508). The listing of previously identified estimated repair values can include a repository of previously-generated values to repair portions of a vehicle. In some instances, the listing of previously identified estimated repair values corresponds to a vehicle of a similar or identical vehicle type to the vehicle involved in the event. In these instances, the process can include identifying a type of vehicle (e.g., make, model, year built) involved in the event and retrieving information relating to that vehicle type.

The process can include identifying a portion of the listing of previously identified estimated repair values that corresponds to the vehicle (block 510). This can include processing the listing of previously identified estimated repair values to identify all entries that correspond to parts of the vehicle that are damaged. For instance, if a bumper of a vehicle is damaged, the system can identify a first entry in the listing of previously identified estimated repair values that includes an estimated repair value to repair the bumper given a derived severity (e.g., a severity value) of the damage to the bumper. This process can identify all portions of the vehicle that are damaged and identifying all relevant entries in the listing of previously identified estimated repair values that correspond to each portion of the vehicle.

The process can include aggregating estimated repair values for all parts of the vehicle that are damaged to generate an aggregate estimated repair value (block 512). The aggregated estimated repair values can be indicative of a total cost to repair the vehicle.

The process can include identifying at least one service provider within a threshold proximity to the location of the vehicle. (block 514). The service provider can include an entity capable of repairing the vehicle or having expertise in estimating a value to repair the value. Identifying the service provider can include comparing a location of the service provider and the location of the event and identifying only service providers within a threshold proximity (e.g., 10 miles, 30 miles) of the location of the event. In some cases, multiple service providers can be identified.

The process can include transmitting the report and/or the aggregated estimated repair value to the at least one service provider (block 516). In some embodiments, the report can be sent to one or more service providers requesting an estimated repair value from the service providers. In other embodiments, the report and the aggregated estimated repair value previously generated by the system can be provided to the service providers to have the service providers confirm or reject the aggregated estimated repair value. For instance, if one estimated repair value is inaccurate, the service provider can "flag" or otherwise provide an alert that the one estimated repair value is inaccurate. As another example, the service provider can confirm or verify the accuracy of the estimated repair values generated by the system. The report and/or the aggregated estimated repair value to the at least one service provider can be sent to the service provider(s) to service provider devices via a suitable communication interface.

The process can include obtaining a response from the at least one service provider indicative of an update to the report and/or the aggregated estimated repair value (block 518). The response provided by the service provider(s) can include a verification/update to system-generated aggregated estimated repair values and/or new aggregated estimated repair values.

The process can include updating the report and/or the aggregated estimated repair value based on the response from the at least one service provider. (block 520). For instance, if an estimated repair value to a bumper of a vehicle is identified by the service provider as being an inaccurate value, the system can update the aggregate estimated repair value based on an updated value to repair the bumper provided by the service provider. Updating the report and/or the aggregated estimated repair value can increase the accuracy in the aggregated estimated repair value while efficiently utilizing computational resources and computer network resources.

The updated/verified aggregated estimated repair value can be utilized in generation of a claim value or a claim report to be presented to the client. As noted above, the claim value can include the aggregated estimated repair value that is modified based on client-specific features indicated in a policy associated with the client. For instance, if the policy indicates that the client has a deductible value, the claim value can include the aggregated estimated repair value minus the deductible value. Other features included in the policy can modify or lower the claim value as well.

The system can utilize policy information, client information, and the retrieved information relating to the qualified event to populate reports/forms to be presented to the client. For instance, the client can be presented a report that includes a line-item description of the qualifying event, a listing of all portions of the vehicle that are damaged, an estimated repair value for each portion of the vehicle that is damaged, associated images/sensor data of the damaged vehicle, client-specific policy features, any modifications to the claim value, the claim value, etc. The report including the claim value can be presented to the client via one of various forms, such as via an application executing on the client device, via electronic message (e.g., e-mail message, SMS), etc.

In some embodiments, the claim value can be available to be accepted or rejected by the client for a predetermined amount of time. If the client fails to respond during the predetermined amount of time, the claim value can be modified or the claim value can no longer be available to the client. In some instances, if the system determines that the client has contacted an entity (e.g., a call center operator), the claim value can be reduced.

Implementation of a Process to Assist in Providing Medical Assistance for a Client As noted above, an event can include a vehicle accident. In some vehicle accidents, medical attention may be needed. For example, paramedics or other emergency personnel may need to be sent to the location of the vehicle accident to attend to immediate medical needs. Further, for assessing various claims and claim values, a client may need to be assessed for injuries by a medical professional. In such an instance, the client may schedule an appointment at a medical provider and may need to populate various forms in order to provide necessary information to the medical provider. However, such a process can be distressful for the client, as various information may be unknown to the client and the client may still be distressed after the occurrence of a vehicle accident.

Accordingly, in some embodiments, a process to assist in providing medical assistance for a client. This can include any of dynamic instruction for emergency medical personnel to provide services for the client after occurrence of a vehicle accident or to automatically schedule a medical appointment for the client that includes populated forms on behalf of the client.

Figure 6:
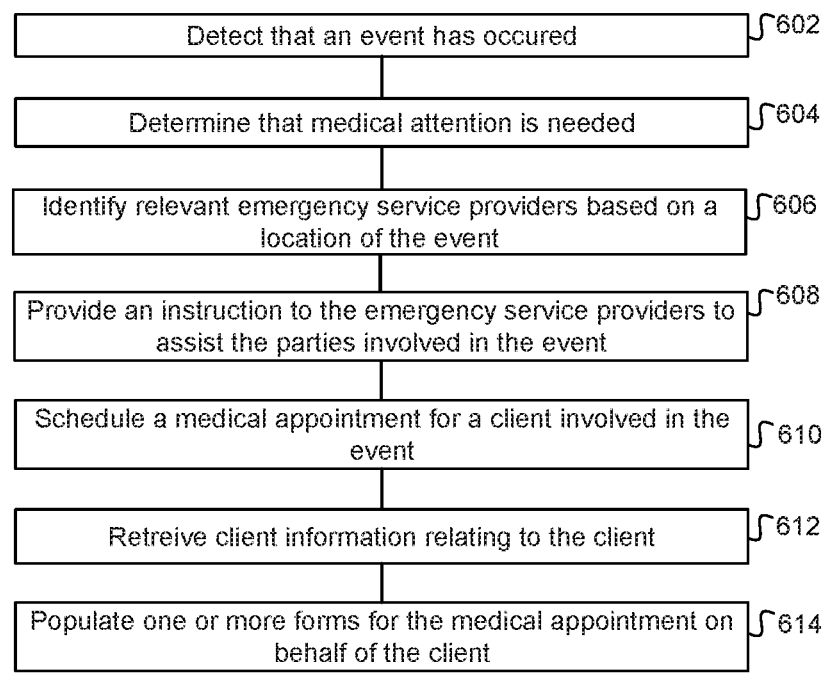
FIG. 6 is an example block diagram for implementing a process to assist in providing medical assistance for a client.

FIG. 6 is an example block diagram for implementing a process 600 to assist in providing medical assistance for a client. The process can include detecting that an event has occurred (block 602). As noted above, determining that an event has occurred can be based on vehicle sensor data, an indication from a client device, etc.

The process can include determining that medical attention is needed (block 604). This can be based on receiving an indication from the client (e.g., via client device or via an application on client device). For instance, the indication from a client device can include a request for medical services (e.g., a phone call to an emergency service provider) and the system can identify that medical services are being requested based on this request. In some embodiments, the system can process vehicle sensor data to determine whether medical services should be requested after a vehicle accident.

The process can include identifying relevant emergency service providers based on a location of the event (block 606). A relevant emergency service provider can include a service provider that is within a threshold proximity to the location of the event. In some instances, the emergency service provider can be selected based on a listing of emergency service providers or by sending an instruction to an emergency service provider (e.g., emergency phone number) and giving the location of the event. In some embodiments, this can include instructing a tow truck to retrieve a vehicle from the location of the event.

The process can include providing an instruction to the emergency service providers to assist the parties involved in the event (block 608). The instruction can be provided via any of a phone call, e-mail, message to an application of the service provider, etc. The instruction can include a location of the event as well as other information, such as a name of the client, a description of the event, vehicle sensor data, etc.

As noted above, a client may require medical assistance from a medical provider. For example, injuries of a client may be inspected by a medical provider to assess the injuries and to determine a value to remedy the injuries. The process can include scheduling a medical appointment for a client involved in the event (block 610). This can include identifying a medical provider within a threshold proximity to the location of the client. This can also include sending a request to schedule an appointment for specified medical services for the client with the medical provider. The request can be sent over an encrypted interface.

The process can include retrieving client information relating to the client (block 612). The system can retrieve client information from a repository of client information and provide this information to the medical provider to schedule the appointment with the medical provider. For instance, a name of the client and other relevant information (e.g., insurance information, contact information) may be provided to the medical provider in order to schedule an appointment to assess injuries incurred in a vehicle accident.

The process can include populating one or more forms for the medical appointment on behalf of the client (block 614). This can include performing text processing processes on one or more forms associated with a medical provider to identify requested information types on the forms. The system can populate portions of a form with relevant information. For example, if a first area on a form is determined to request a name of the client, the system can retrieve corresponding information from a listing of client information and input the information into the form.

Example Device Implementation Overview

Figure 7:
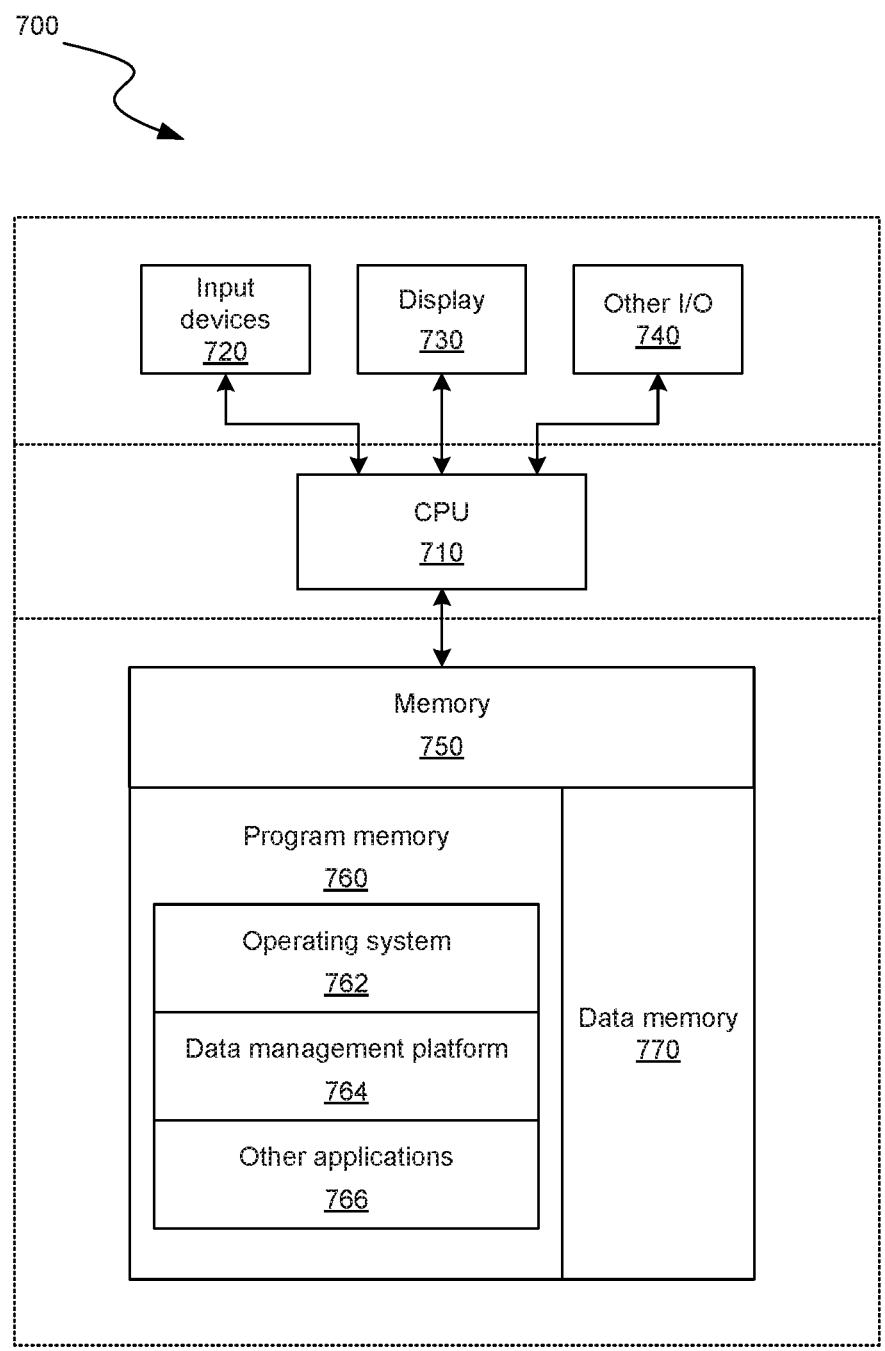
FIG. 7 is a block diagram illustrating an overview of devices on which some implementations of the present embodiments can operate.

FIG. 7 is a block diagram illustrating an overview of devices on which some implementations of the present embodiments can operate. The devices can comprise hardware components of a device 700, such as a server, mobile device, and/or computing node of a vehicle as described herein.

Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a person operating the device 700. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, camera, printer, speakers, CD-ROM drive, DVD drive, disk drive, or Blu-Ray device.

In some implementations, the device 700 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 700 can utilize the communication device to distribute operations across multiple network devices.

The CPU 710 can have access to a memory 750. A memory can include one or more of various hardware devices for volatile and non-volatile storage and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software. Memory 750 can also include data memory 770 that can include various information as described in this patent document, which can be provided to the program memory 760 or any element of the device 700. The program memory 760 can include a data management platform 764 and other applications 766 capable of performing the processing tasks as described herein.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in the present Figures and/or in the various embodiments described in this patent document.

Those skilled in the art will appreciate that the components illustrated in FIGS. 1-5 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A system comprising:
  a server configured to:
  a server configured to:
  detect, via a communication interface of a vehicle, that a vehicle-related incident has occurred based on one or more changes in telematics data acquired by one or more sensors of the vehicle, wherein detecting includes the one or more sensors determining that the vehicle was in a collision with a second vehicle, determining that the vehicle accelerated or decelerated at a rapid rate, and determining that the vehicle-related incident has occurred, and wherein the one or more changes includes a direction and magnitude of deceleration;
  retrieve a set of information relating to the vehicle-related incident from multiple sources;

generate a model representative of the vehicle based on the set of information and the telematics data to identify one or more damaged portions of the vehicle from the vehicle-related incident;

compare the model representative of the vehicle to a template representing an undamaged vehicle;

identify, based on the comparison, the one or more damaged portions of the vehicle by identifying whether portions of the vehicle depicted in the set of information relating to the vehicle-related incident includes a difference that exceeds a threshold difference from the template of the undamaged vehicle;

determine a severity level of damage to the one or more damaged portions of the vehicle based on the identified difference;

determine a location of the vehicle-related incident; and in response to the severity level of the damage exceeding a threshold level, automatically send an emergency notification to an emergency system, wherein the emergency notification includes the location of the vehicle-related incident.

2. The system of claim 1, wherein the server is further configured to:

obtain vehicle diagnostic information indicative of data acquired by the one or more sensors disposed on the vehicle via a communication interface of the vehicle; and process the vehicle diagnostic information to determine that the data acquired by the one or more sensors indicating that damage has been caused to the vehicle or that a safety mechanism of the vehicle has been activated.

3. The system of claim 1, wherein retrieving the set of information relating to the vehicle-related incident from the multiple sources further includes:

receive a set of vehicle sensor data from a communication interface of the vehicle;

receive a set of client device data from a client device, the set of client device data including a first set of images indicative of the vehicle;

receive a set of external device data from at least one external device disposed in an environment surrounding the vehicle, the set of external device data including a second set of images indicative of the vehicle; and process the set of vehicle sensor data, the set of client device data, and the set of external device data to identify a subset of data that represents information relating to each damaged portion of the vehicle.

4. The system of claim 1, wherein the server is further configured to:

obtain a series of criteria that are indicative of whether the vehicle-related incident is capable of automatic generation of a client value based on the set of information relating to the vehicle-related incident;

compare the set of information relating to the vehicle-related incident with the series of criteria to determine a number of criteria that are satisfied by the set of information relating to the vehicle-related incident;

determine whether the number of criteria that are satisfied by the set of information relating to the vehicle-related incident exceed a threshold number; and responsive to determining that the number of criteria that are satisfied by the set of information relating to the vehicle-related incident exceeds the threshold number, identify the vehicle-related incident as the vehicle-related incident.

5. The system of claim 1, wherein the server is further configured to:

retrieve the template representing the undamaged vehicle that includes a vehicle type that corresponds to the vehicle type of the vehicle; and compare the set of information relating to the vehicle-related incident with the template of the undamaged vehicle to identify each damaged portion of the vehicle by identifying whether each portion of the vehicle depicted in the set of information relating to the vehicle-related incident includes the difference from the template of the undamaged vehicle that exceeds the threshold difference.

6. The system of claim 5, wherein the server is further configured to:

process the set of information relating to the vehicle-related incident to generate the model representative of the vehicle.

7. The system of claim 5, wherein determining the severity level of the damage to each damaged portion of the vehicle further includes:

for each portion of the vehicle, identify the difference between the set of information relating to the vehicle-related incident and the template representing the undamaged vehicle; and assign a severity value for each damaged portion of the vehicle, the severity value indicative of a level of the damage to each damaged portion of the vehicle.

8. The system of claim 1, wherein the server is further configured to:

identify the location of the vehicle-related incident based on the set of information relating to the vehicle-related incident;

retrieve a listing of previously-identified rectification values that includes a series of entries identifying previously-identified values to rectify damage to portions of various vehicles;

inspect the listing of previously-identified rectification values to identify a subset of entries in the listing of previously-identified rectification values that correspond to each damaged portion of the vehicle and the location of the vehicle-related incident; and combine each previously-identified rectification value that corresponds to each damaged portion of the vehicle to generate an estimated value to rectify the damage to each damaged portion of the vehicle.

9. The system of claim 1, wherein the server is further configured to:

generate an estimated damage value report that includes a listing of each portion of the vehicle that is damaged and a subset of the set of information of the vehicle-related incident relating to each portion of the vehicle;

identify a service provider that is located within a threshold proximity of the vehicle;

send a request to a device associated with the service provider that includes the estimated damage value report;

receive a response from the device associated with the service provider that includes an estimated rectification values for each damaged portion of the vehicle; and combine each estimated rectification value for each portion of the vehicle that is damaged to generate an estimated value to rectify the damage to each damaged portion of the vehicle.

10. A method for analyzing a vehicle-related event, the method comprising:
  detecting, via a communication interface of a vehicle, that a vehicle-related incident has occurred based on one or more changes in telematics sensor data acquired by one or more sensors of the vehicle, wherein detecting includes the one or more sensors determining that the vehicle was in a collision with a second vehicle, determining that the vehicle accelerated or decelerated at a rapid rate, and determining that the vehicle-related incident has occurred, and wherein the one or more changes includes a direction and magnitude of deceleration;
  retrieving a set of information relating to the vehicle-related incident from multiple sources of information;
  generating a model representative of the vehicle based on the telematics data and the set of information to identify one or more damaged portions of the vehicle from the vehicle-related incident;
  comparing the model representative of the vehicle to a template representing an undamaged vehicle;
  identifying, based on the comparison, the one or more damaged portions of the vehicle by identifying whether portions of the vehicle depicted in the set of information relating to the vehicle-related incident includes a difference that exceeds a threshold difference from the template of the undamaged vehicle;
  determining a severity level of damage to the one or more damaged portions of the vehicle based on the identified difference;
  determining a location of the vehicle-related incident; and
  in response to the severity level of the damage exceeding a threshold level, automatically sending an emergency notification to an emergency system, wherein the emergency notification includes the location of the vehicle-related incident.

11. The method of claim 10, further comprising:
  generating a report that identifies the severity level of damage to the vehicle; and
  transmitting the report to a client device associated with a client, wherein the report is accessible on an application executing on the client device,
  wherein the report includes a line-item listing of each portion of the vehicle that is damaged, a subset of the set of information representing each portion of the vehicle that is damaged, a previously-identified estimated rectification value for each portion of the vehicle that is damaged, wherein the report is presented to the client with a client value, the report accessible on an application executing on the client device.

12. The method of claim 11, further comprising:
  determining that a predetermined time duration has elapsed without receipt of an acceptance notification from the client device indicating an acceptance of a client value, the predetermined time duration that beginning when the client value is presented to the client device; and
  responsive to determining that the predetermined time duration has elapsed, lowering the client value by a predetermined amount or removing the client value from the client device.

13. The method of claim 11, further comprising:
  retrieving a set of features that are specific to the client from a repository of client data.

14. The method of claim 10, further comprising:
  generating an estimated damage value report that includes, for each portion of the vehicle that is damaged, a subset of the set of information of the vehicle-related incident relating to each portion of the vehicle and an estimated value to rectify the damage to each portion of the vehicle;
  identifying a service provider that is located within a threshold proximity of the vehicle;
  sending a request to a device associated with the service provider that includes the estimated damage value report;
  receiving a response from the device associated with the service provider that includes either a confirmation of the estimated value to rectify the damage to each portion of the vehicle or at least one update to the estimated value to rectify the damage to each portion of the vehicle; and
  updating the estimated value based on the response from the device associated with the service provider.

15. The method of claim 11, wherein retrieving the set of information relating to the vehicle-related event from multiple sources of information further includes:
  receiving a set of vehicle sensor data from a communication interface of the vehicle, the set of vehicle sensor data including any of sensor data obtained from the one or more sensors disposed on the vehicle and a first set of images captured by cameras disposed on the vehicle;
  receiving a set of client device data from the client device associated with the client, the set of client device data including a second set of images indicative of the vehicle;
  receiving a set of external device data from at least one external device disposed around an environment that includes the vehicle and maintained by an external entity, the set of external device data includes a third set of images indicative of the vehicle; and
  processing the set of vehicle sensor data, the first set of images, the second set of images, and the third set of images to identify a subset of image that depict each portion of the vehicle that is damaged.

16. The method of claim 10, further comprising:
  obtaining a series of criteria indicative of whether the vehicle-related incident is capable of automatic generation of a client value based on the set of information relating to the vehicle-related incident;
  comparing the set of information relating to the vehicle-related incident with the series of criteria to determine a number of criteria that are satisfied by the set of information relating to the vehicle-related incident;
  determining whether the number of criteria that are satisfied by the set of information relating to the vehicle-related incident exceed a threshold number; and
  responsive to determining that the number of criteria that are satisfied by the set of information relating to the vehicle-related incident exceeds the threshold number, identify the vehicle-related incident as the vehicle-related event.

17. A non-transitory machine-readable medium having machine executable instructions stored thereon that, when executed by one or more processors, direct the one or more processors to perform a method for analyzing a vehicle-related event, the method comprising:
  detecting, via a communication interface of a vehicle, that a vehicle-related incident has occurred based on one or more changes in telematics sensor data acquired by one or more sensors of the vehicle, wherein detecting includes the one or more sensors determining that the vehicle was in a collision with a second vehicle, determining that the vehicle accelerated or decelerated at a rapid rate, and determining that the vehicle-related incident has occurred, and wherein the one or more changes includes a direction and magnitude of deceleration;

retrieving a set of information relating to the vehicle-related incident from multiple sources of information;

generating a model representative of the vehicle based on the telematics data and the set of information to identify one or more damaged portions of the vehicle from the vehicle-related incident;

comparing the model representative of the vehicle to a template representing an undamaged vehicle;

identifying, based on the comparison, the one or more damaged portions of the vehicle by identifying whether portions of the vehicle depicted in the set of information relating to the vehicle-related incident includes a difference that exceeds a threshold difference from the template of the undamaged vehicle;

determining a severity level of damage to the one or more damaged portions of the vehicle based on the identified difference;

determining a location of the vehicle-related incident; and in response to the severity level of the damage exceeding a threshold level, automatically sending an emergency notification to an emergency system, wherein the emergency notification includes the location of the vehicle-related incident.

18. The non-transitory machine-readable medium of claim 17, wherein retrieving the set of information relating to the vehicle-related event from multiple sources of information further comprises:

receiving a set of vehicle sensor data from a communication interface of the vehicle;

receiving a set of client device data from a client device associated with a client, the set of client device data including a first set of images indicative of the vehicle;

receiving a set of external device data from at least one external device disposed around an environment that includes the vehicle, the set of external device data includes a second set of images indicative of the vehicle; and processing the set of vehicle sensor data, the set of client device data, and the set of external device data to identify a subset of data that represents information relating to the damage to the vehicle.

19. The non-transitory machine-readable medium of claim 17, wherein the method further comprises:

retrieving a set of images representing an undamaged vehicle that includes a vehicle type that corresponds to the vehicle type of the vehicle; and comparing the set of information relating to the vehicle-related incident with the set of images of the undamaged vehicle to identify whether each portion of the vehicle is damaged by identifying whether each portion of the vehicle depicted in the set of information relating to the vehicle-related incident includes the difference between the set of information relating to the vehicle-related incident and the set of images of the undamaged vehicle that exceeds the threshold difference.

20. The non-transitory machine-readable medium of claim 17, wherein the method further comprises:

identifying the location of the vehicle-related event based on the set of information relating to the vehicle-related incident;

retrieving a listing of previously-identified estimated rectification values that includes a series of entries identifying previously-identified estimated values to rectify damage to portions of a series of vehicles;

inspecting the listing of previously-identified estimated rectification values to identify a subset of entries in the listing of previously-identified estimated rectification values that correspond to the portions of the vehicle and the location of the vehicle-related event; and combining each previously-identified estimated rectification value of the subset of entries in the listing of previously-identified estimated rectification values that correspond to the portions of the vehicle that are damaged to generate an estimated value to rectify the damage to each portion of the vehicle that are damaged.

\* \* \* \* \*